Figure 1:
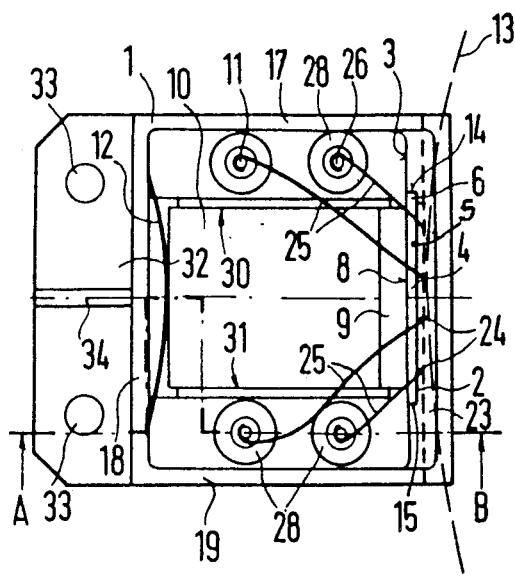

United States Patent [19]

Meyer et al.

[11] Patent Number: 4,771,240
[45] Date of Patent: Sep. 13, 1988

[54] MAGNETIC FIELD SENSOR WITH MAGNETIC FIELD-DEPENDENT RESISTOR

[75] Inventors: Hans P. Meyer; Helmut Becker, both of Nuremberg, Fed. Rep. of Germany

[73] Assignee: Alcatel N.V., Amsterdam, Netherlands

[21] Appl. No.: 811,076

[22] Filed: Dec. 18, 1985

[30] Foreign Application Priority Data

Dec. 24, 1984 [DE] Fed. Rep. of Germany ....... 3447312

[51] Int. Cl.⁴ .................. G01R 33/06; H01L 43/08; G01B 7/14
[52] U.S. Cl. .................... 324/252; 324/208; 324/235; 338/32 R
[58] Field of Search .............. 324/173, 174, 207, 208, 324/235, 228, 251, 252; 360/112, 113; 338/32 R, 32 H; 307/309

[56] References Cited

U.S. PATENT DOCUMENTS

| 3,195,043 | 7/1965 | Burig et al. | 324/235 |
| 4,052,748 | 10/1977 | Kuijk | 324/252 X |
| 4,105,972 | 8/1978 | Smith | 324/220 |
| 4,392,166 | 7/1983 | Ishikawa et al. | 360/113 |
| 4,420,727 | 12/1983 | Rau . | |
| 4,629,982 | 12/1986 | Kieslich | 324/208 |

FOREIGN PATENT DOCUMENTS

| 0110122 | 6/1984 | European Pat. Off. | 324/207 |
| 2426420 | 12/1975 | Fed. Rep. of Germany . | |
| 0024615 | 2/1980 | Japan | 324/207 |
| 2027206 | 2/1980 | United Kingdom | 324/208 |
| 2095034 | 9/1982 | United Kingdom | 324/252 |

OTHER PUBLICATIONS

"The Magnetoresistive Sensor–A Sensitive Device for Detecting Magnetic Field Variation"; U. Dibbern et al., 8028 Electronic Components & Applications, vol. 5 (1983), Jun., No. 3, Eindhoven, Nederland, pp. 148–153.
Valvo Technische Information; Magnetoresistive Sensoren, 840323; nach Unterlagen von U. Dibbern und A. J. Petersen bearbeitet von C.-H. Kramp, pp. 1-8.

Primary Examiner—Gerard R. Strecker
Attorney, Agent, or Firm—Spencer & Frank

[57] ABSTRACT

In a magnetic field sensor comprising at least one magnetic-field-dependent resistor disposed in the vicinity of an outer side of a housing that is open on at least one side and further comprising a permanent magnet that is adjacent to said magnetic-field-dependent resistor, the magnetic-field-dependent resistor(s) (6), arranged on a support (4), are in a contacting relationship with the inside of a detector side wall (2) of the housing (1), and the thickness (x) of said detector side wall (2) is, at least in the area of the active surface of the magnetic-field-dependent resistors (6), smaller than that of the other housing walls (17, 18, 19) and/or the housing base (20). A rugged, high-resolution magnetic field sensor is thus obtained.

14 Claims, 1 Drawing Sheet

MAGNETIC FIELD SENSOR WITH MAGNETIC FIELD-DEPENDENT RESISTOR

The present invention relates to a magnetic field sensor having at least one magnetic-field-dependent resistor.

A magnetic field sensor of this nature is disclosed in DE-OS No. 24 26 420, in which one pole of the permanent magnet is disposed at the center leg of a U-shaped yoke which surrounds it. Two magnetic-field-dependent semiconductor resistors are arranged, e.g. bonded, one adjacent to the other on the opposite pole surface. The upper flat side of the magnetic-field-dependent resistors can be provided with a protective coating. Disposed on the U-legs of the yoke is a film, a portion of which consists of soft magnetic material, which causes a change in the resistance of the magnetic-field-dependent semiconductor resistors. The magnetic flux of the permanent magnet is closed via the yoke, the soft magnetic portions of the film and the air gap between the film and the pole of thepermanent magnet that contains the magnetic-field-dependent semiconductor resistors. The film is attracted by the magnetic field strength and is in a contacting relationship witht helegs of the yoke, sliding thereupon when the film and the remainder of the system are moved one relative to the other.

It is the object of the present invention to design a sensor that responds to a magnetic fieldo or to a change in the magnetic field in such a manner that it can be employed universally, is of rugged design and permits a high resolution to be achieved. The magnet field sensor developed in accordance with the teachings of the present invention is virtually damage free, and it may be employed in conjunction with numerous conceivable magnetic-field-control systems, such as magnetic or magnetizable gears or racks, foil control grids, etc. Moreover, it has been found that an uninterrupted magnetic flux is not necessary, thereby obviating the need for the yoke. Yet, nevertheless, external magnetic fields do not influence the sensor.

Further advantageous details of the present invention are contained in the subclaims and described below with the aid of an embodiment illustrated in the drawings, in which FIG. 1 shows a top view of a magnetic sensor according to the present invention in an unpotted state or when potted with transparent potting material.

Figure 2:
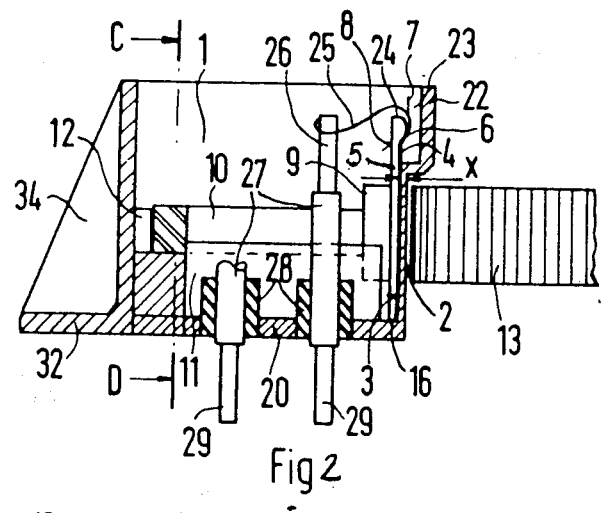
Figure 3:
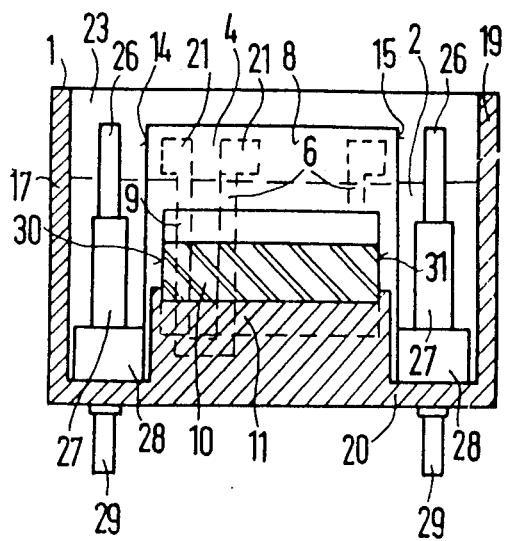

FIG. 2 shows a side elevation of the magnetic sensor shown in FIG. 1 taken along section line A-B in FIG. 1; and FIG. 3 shows an elevation view of the magnetic sensor shown in FIG. 1 taken along section line C-D in FIG. 2.

Numeral 1 denotes a housing, which is open at least at the top, of a non-magnetic metal, such as brass, die-cast zinc or, preferably, aluminum, or of a preferably insulating plastic. In the embodiment being described, it is made of metal. One flat side 5 of a support 4 which may take the form of a conventional substrate or the like, is arranged on the inside 3 of a detector side wall 2. Attached to flat side 5 of support 4 is/are one or a plurality of magnetic-field-dependent resistors 6 in the form of the strips illustrated as extending from top to bottom in FIG. 1 and illustrated by means of dashed lines in FIG. 3, with magnetic-field-dependent resistors 6 being in a contacting relationship therewith on inside 3 either directly or indirectly, e.g. by means of a film 7, in particular an insulating film. Instead of the film, it is also possible to apply an insulating coating to support 4 and magnetic-field-dependent resistors 6. A pole plate 9 of a permanent magnet 10 is in a contacting relationship with the other flat side 8 of support 4. Permanent manget 10 is guided slidably in the direction of support 4 in a guide bed 11 in housing 1 and is forced against pole plate 9, which, in turn, is forced against support 4, by means of the effect of a compression spring 12. Consequently, magnetic-field-dependent resistors 6 are in a contacting relationship with inside 3, with virtually no air gap.

On the outside, a control element 13 of soft iron or hard magnetic material, for example the gear or rack, etc. suggested in the drawing, can be moved past detector side wall 2 in the immediate proximity thereof, for example at a distance of up to approximately 1 mm therefrom whereupon the sensor may be employed as a proximity or position detecting device or in tachometer applications. This permits the magnetic field that permeates magnetic-field-dependent resistors 6 to be varied. In order to obtian a strong change in the magnetic field, and thus a strong change in the resistance in magnetic-field-dependent resistors 6, detector side wall 2 is, at least in the active area of magnetic-field-dependent resistors 6 or entire support 4, of thin-walled or diaphragm-like, thin design. The wall thickness x may have an exemplary thickness of 0.03 to a maximum of 1 mm, preferably 0.1 to 0.6 mm. The thin zone (or detection portion) of detector side wall 2 can be formed by means of a recess on inside 3, thereby creating three side edges, which fix the location of support 4 at least onits three longitudinal edges 14, 15, 16. Wall thickness x is preferably thinner than the thickness of the other housing walls 17, 18, 19 and/or the housing base 20.

In order to permit magnetic-field-dependent resistors 6 to be electrically connected on the flat side 5 of support 4, to which they are deposited, thereby eliminating the need fr through connection or peripheral connection of support 4, housing 1 has outwardly formed wall portion 22 in the area of the electrical connection surfaces 21 of magnetic-field-dependent resistors 6 on detector side wall 2. This forms an interior void (open space) 23 adjacent the open end of the housing 1, into which support 4 projects, free of compression and contact, together with the soldering or bonding points 24 of electrical connection surfaces 21 with leads 25.

Each of the other ends of leads 25 is electrically and mechanically connected with one internal end 26 of a terminal 27, which is designed in the form of a connecting pin, for example. Terminals 27 are attached in housing 1, e.g. press-fitted or cast-in, with a special insulating member 28, e.g. a glass or ceramic or plastic penetration element, being disposed thereabout in the case of an electrically conductive housing 1. The outwardly extending end 29 of terminal 27 is preferably designed in the form of a plug connector, for example in the form of a round or flat cable plug. Preferably, permanent magnet 10 is arranged generally in the center, with termianls 27 being disposed on one or both longitudinal sides 30, 31 thereof. Formed on housing 1 is a projecting attachment tab 32, with which housing 1 can be mounted in a position of use by means of the holes 33, for example. Moreover, it is advantageous to provide a reinforcing rib 34, which connects tab 32 and housing 1.

It is practical for housing 1 to be open on one side. The individual components, i.e. support 4, pole plate 9, prmanent magnet 10 and compression spring 12, as well as a film 7, if necessary, are inserted from this side, with housing 1 then being potted by means of a potting material. A polyester-base synthetic resin and/or an epoxy resin and/or silicon rubber can be employed as the potting material or, if such high mechanical strength is not required, a wax, as well.

The magnetic-field-dependent resistors are preferably disposed on support 4 in the form of resistor arrangements whosenature permits them to be interposed in a bridge circuit or combined to form a full bridge, i.e. usually four magnetic-field-dependent resistors 6, for example stripes or double stripes.

Magnetic-field-dependent resistors which were treated during the fabrication process by means of a magnetic field of such a nature that the easy-axis direciton extends in the direction of the tripe, i.e. in such a manner that they display uniaxial anisotropy parallel to the magnetic-field-dependent resistor stripes, are preferably suitable for employment as the magnetic-field-dependent resistors. Stripes of this nature are preferably made of ferromagnetic material, such as NiFe, CoFeB, FeB, etc, for example, and the coating thickness thereof is not greater than 0.5 μm.

We claim:

1. A magnetic field sensor, comprising:
   a housing having a plurality of walls enclosign an interior space and an open side opening to said interior space, said plurality of walls having a thickness and including a detector side wall, said detector side wall having a detection portion, said detection portion having a thickness which is less than the thickness of the others of said plurality of walls and an inner surface facing said interior space;
   a plate-like support in said housing confronting said inner surface of said detection portion;
   a magnetic-field-dependent resistor mounted on one side of said support, said resistor having an active area and lying in said active area on said inner surface of said detection portion; and
   permanent magnet means, having a pole in said housing located on a side of said support opposite said one side and adjacent said resistor for producing a magnetic field through said resistor and said detection portion between said permanent magnet means and a side of said detection portion opposite said resistor so that the resistance of said resistor is changed by a change in the magnetic field;
   said resistor having a connection point for bonding to a bonding point of a connecting wire, a part of said detector side wallprojecting outwardly relative to said detection portion away from said support, so as to define a free space between said connection point and said part of said detector side wall, said support and said connection point projecting into said free space in spaced relation to said part of said detector side wall, whereby said resistor is bondable to the bonding point of the connecting wire and a change in the magnetic field is reflected in a change in said resistance sensed as a change in an electrical signal applied across said resistor through the wire.

2. A sensor as is claim 1, wherein said plurality of walls includes a bottom wall opposite said open side, said detector side wall extending between said bottom wall and said open end, said open side being adjacent said free space so as to provide access to said connection point.

3. A sensor as in claim 1, wherein said detector side wall is recessed at said detection portion so as to receive said support and fix said support in directions along said inner surface.

4. The magnetic field sensor according to claim 1 additionally comprising a non-magnetic, electrically insulating layer overlying said resistor, said electrically insulating layer being interposed between said at leaast one magnetic field dependent resistor and said detection portion.

5. The magnetic field sensor according to claim 1 additionally comprising:
   a guide bed in said housing slidably mounting said permanent magnet means in said housing; and
   bias means for biasing said permanent magnet means along said guide bed against said support, said support in turn being biased toward said detection portion of said detector side wall.

6. The magnetic field sensor according to claim 1 wherein said permanent magnet means comprises a permanent magnet and a pole plate, said pole plate being interposed between said permanent magnet and said support.

7. The magnetic field sensor according to claim 5 wherein said permanent magnet means comprises a permanent magnet and a pole plate, said pole plate being interposed between said permanent magnet and said support.

8. The magnetic field sensor accoridng to claim 3 wherein said housing is formed of a non-magnetic metal.

9. The magnetic field sensor according to claim 1 wherein said housing is formed of plastic.

10. The magnetic field sensor according to claim 1 wherein said walls include a base opposite said open side, said sensor additionally comprising insulated terminal means extending through said base and means for connecting said resistor to said terminal means.

11. The magnetic field sensor according to claim 1 additionally comprising an attachment tab having at least one aperture therein formed on siad housing for connecting said housing to an external device, and a reinforcing rib on said attachment tab and fixed to said housing.

12. The magnetic field sensor according to claim 1 wherein said housing is filled with potting material formed of one of polyester resin epoxy resin and silicon paper.

13. The magnetic field sensor according to claim 1 wherein said resistor takes the form of a stripe of ferromagnetic material having a maximum coating thickness of 0.5 μm and exhibiting an easy axis in a direction extending parallel to said stripes.

14. A magnetic field sensor, comprising:
   a housing having a plurality of walls enclosing an interior space and an open side opening to said interior space, said puurality of walls having a thickness and including a detector side wall, said detector side wall having a detection portion having a thickness which is less than the thickness of the others of said plurality of walls and an inner surface facing said interior space;
   a plate-like support in said housing confronting said inner surface of said detection portion;
   a plurality of magnetic-field-dependent resistors interconnected in a bridge arrangement and mouned on one side of said support, said resistors having active areas and lying, in said active areas, on said inner surface of said detection portion; and permanent magnet means, having a pole in said housing located on a side of said support opposite said one side and adjacent said resistors, for producing a magnetic field through said tesistors and said detection portion between said permanent magnet means and a side of said detection portion opposite said resistors so that the resistance of said resistor is changed by a change in the magnetic field;

said resistors having connection points for bonding to bondign points of connecting wires, a part of said detector side wall projecting outwardly relative to said detection portion away from said support, so as to define a free space between said connection points and said part of said detector side wall, said support and said connection points projecting into said free space in spaced relation to said part of said detector side wall, whereby said resistors are bondable to the bonding points of the connecting wires and a change in the magnetic field is reflected in a change in said resistance senses as a change in an electrical signal applied across said resistors through the wires.

* * * * *